United States Patent [19]
Jones et al.

[11] Patent Number: 5,555,042
[45] Date of Patent: Sep. 10, 1996

[54] APPARATUS FOR AUTOMATICALLY FEEDING SLIDES INTO A FILM SCANNER

[75] Inventors: Robert S. Jones; Thomas W. Mort, both of Rochester, N.Y.

[73] Assignee: Eastman Kodak Company, Rochester, N.Y.

[21] Appl. No.: 319,188

[22] Filed: Oct. 6, 1994

[51] Int. Cl.$^6$ ............ G03B 23/02; H04N 5/253
[52] U.S. Cl. ............ 353/103; 348/110
[58] Field of Search ............ 353/103, 104, 353/107, 117, 120; 348/96, 110

[56] References Cited

U.S. PATENT DOCUMENTS

| | | | |
|---|---|---|---|
| 2,982,177 | 5/1961 | Briskin et al. | 88/28 |
| 3,171,222 | 3/1965 | Sakaki et al. | 40/79 |
| 3,486,818 | 12/1969 | Hoppmann et al. | 353/118 |
| 3,501,234 | 3/1970 | Johannsen et al. | 353/104 |
| 3,644,029 | 2/1972 | Stieringer | 353/103 |
| 3,822,937 | 7/1974 | Kroeger | 353/114 |
| 3,847,473 | 11/1974 | Sobotta | 353/114 |
| 3,936,169 | 2/1976 | Barowski et al. | 353/115 |
| 3,973,842 | 8/1976 | Woerner | 353/19 |
| 4,165,161 | 8/1979 | Kramer | 353/86 |
| 4,188,100 | 2/1980 | Pritchett | 353/95 |
| 4,382,663 | 5/1983 | Neudecker | 353/104 |
| 4,390,257 | 6/1983 | Fernekes et al. | 353/95 |
| 4,575,231 | 3/1986 | Seto | 355/76 |
| 4,765,734 | 8/1988 | Truc et al. | 348/110 |
| 4,858,003 | 8/1989 | Wirt et al. | 358/102 |
| 4,933,690 | 6/1990 | Sangregory et al. | 353/103 |
| 4,943,853 | 7/1990 | Morisawa | 348/110 |
| 5,111,241 | 5/1992 | Kralles | 355/75 |
| 5,155,596 | 10/1992 | Kurtz et al. | 358/214 |
| 5,210,556 | 5/1993 | Kronbauer et al. | 353/120 |
| 5,448,372 | 9/1995 | Axman et al. | 348/96 |
| 5,467,153 | 11/1995 | Fargeot | 353/122 |

FOREIGN PATENT DOCUMENTS

| | | |
|---|---|---|
| 0578203 | 1/1994 | European Pat. Off. . |
| 2250134 | 5/1975 | France . |
| 2627044 | 8/1988 | France . |
| 4124502 | 1/1993 | Germany ............ G03B 21/13 |

*Primary Examiner*—William C. Dowling
*Attorney, Agent, or Firm*—Gordon M. Stewart

[57] ABSTRACT

Apparatus for automatically inserting 35 mm photographic slides into a slide scanning gate in the scanning station of a film scanner, scanning the slide, and ejecting the slides on completion of scanning. A vertical mount in the film scanner housing receives a rotatable slide tray having customer orders in selected tray slots to present each selected slide into alignment laterally in a horizontal plane with the film scanning gate. A load arm is actuated to load the slide from the tray slot into the scanning gate. The scanning gate accepts slides in mounts of varying size and thickness and centers the slide film image frame in alignment with a film scanning plane in the scanning station. The scanning gate is translated in the scanning station out of the load position for low and high resolution scans and returned to the load position. A return arm is actuated to eject the slide from the scanning gate and back into the same slot in the tray, and the tray is rotated to present the next selected slide into alignment with the load and return arms and the slide scanning gate. The system scans slides of different customer orders in accordance with instructions entered into an electronic control system.

17 Claims, 8 Drawing Sheets

APPARATUS FOR AUTOMATICALLY FEEDING SLIDES INTO A FILM SCANNER

CROSS REFERENCE TO RELATED APPLICATION

Reference is made to U.S. patent application Ser. Nos.: 167,643 filed on Dec. 14, 1993 and now U.S. Pat. No. 5,400,117, and entitled "Film Clamp For Flattening Image Frames in a Scanning Gate"; 197,777 filed Feb. 16, 1994 and now U.S. Pat. No. 5,465,134, and entitled "Passive Film Take-up Chamber"; 197,775 filed Feb. 16, 1994 and now U.S. Pat. No. 5,386,276, and entitled "Light Integrating Cavity for a Film Scanner"; 197,774 filed Feb. 16, 1994 and now U.S. Pat. No. 5,448,049; and entitled "Film Latent Image Bar Code (LIBC) Reader"; 197,778 filed Feb. 16, 1994 and still pending and entitled "Film Positioning Method and Apparatus"; and 201,282 filed Feb. 16, 1994 and now U.S. Pat. No. 5,461,492 and entitled "Film Scanner with In-Line Dual Scanning Gates".

FIELD OF THE INVENTION

The present invention relates to an apparatus which automatically inserts 35 mm photographic slides from a slot in a slide tray into a scanning gate of a film scanner, holds the slides in a predetermined plane in the scanning gate while the slide is translated past the scanner components, and ejects the slides on completion of scanning back into the slot.

BACKGROUND OF THE INVENTION

Conversion of analog images into digital data has become widespread for a variety of applications, including storing, manipulating, transmitting and displaying or printing copies of the images. For example, images captured in photographic media are converted to digital data and stored on compact discs for readout and display as a video image, as exemplified by the KODAK® Photo-CD system, or reproduced employing various types of color printers. In order to convert the photographic image into a set of digital line data, the film image frame is transported through a film scanning station past, and illuminated in each scan line with a linear light beam of uniform, diffuse illumination, typically produced by a light integrating cavity or integrator.

The light transmitted through the illuminated scan line of the image frame is focused by a lens system on a linear CCD array, image detector which typically produces three primary color light intensity signals for each image pixel that are digitized and stored. The digitized signal values for each scan line may be formatted to a standard for video recording and display and stored on compact disc or magnetic media. Such film scanners take a variety of forms, and the various common aspects of film image frame digitizing, particularly line illumination and linear CCD array-based digitizers, are described in greater detail in commonly assigned U.S. Pat. No. 5,155,596.

In order to perform line scanning of an image frame of photographic negative filmstrips, it is necessary to provide an accurate film transport mechanism to transport a filmstrip into a scanning gate and hold the image frame flat in alignment with a scanning aperture. Typically, the linear CCD array and scanning light beam are stationary so that the light beam illuminates a line of the filmstrip image frame, and a line of digitized data is stored. The scanning gate is incrementally moved or translated line-by-line by a translation stage until the entire image frame is digitized. Then a new image frame is positioned and flattened for scanning and digitizing. Such a scanning and digitizing system for Photo-CD conversion is embodied in the KODAK® PIW Model 2400 Photo-CD scanner system marketed by the assignee of this application.

In the Model 2400 film scanner, the scanning plane is vertical and the stationary scanner components are oriented horizontally. Negative filmstrips are scanned in a process described more completely in the above referenced, co-pending applications that involves a low resolution pre-scan in a first pass and a high resolution main-scan in a second pass.

The filmstrip scanning gate includes the filmstrip scanning aperture, a clamp for flattening the image frame, the filmstrip drive roller assembly and a sensor for deriving perforation signals for use in re-positioning the image frames for high resolution scanning. It is possible to scan positive color transparencies in mounts, i.e. slides, in the Model 2400 Photo-CD scanner employing common components of the same film scanner station. To do so, it is necessary for the operator to manually replace the filmstrip scanning gate and substitute a slide clamp and scanning gate, in its place on the translation stage. The slides are manually inserted into a clamp so that one side of the slide mount is fitted against a fixed aperture frame. Thus, the slide scanning plane varies with the thickness of the slide mount, requiring re-focus of the scanning lens to the image plane.

The scanning area is left open in this film scanner to allow frequent replacement of the scanning gates, and the scanning station is therefore open to the infiltration of dust particles. The exchange of the scanning gates is tedious and mechanical breakdowns are possible in attempting the exchange. Moreover, the scanning gates are subject to damage when they are carelessly handled or stored when not in use. Finally, the process is slow and productivity in scanning slides is low.

When inserting slides manually, operator fatigue sets in, thus decreasing the number of slides that can be scanned per hour. At best, about seventy-two slides can be inserted manually and scanned per hour by a skilled operator.

A lower resolution scanning and digitizing system of either a negative filmstrip or a positive slide for direct display as a video image is generally disclosed in commonly assigned U.S. Pat. No. 4,858,003. The '003 patent describes a mechanism for introducing and ejecting individual slides from a slide receiver frame in the scanning gate. The slides are held flat with one side against a fixed frame surrounding the scanning window, which defines a first scanning plane, regardless of the thickness of the slide. Negative filmstrips are fitted into an elongated carrier so that-individual image frames are introduced into and aligned with a second scanning plane. The optical system is adjusted to the first and second scanning planes when slides and negative filmstrip carriers, respectively, are presented for scanning. However, there is no provision for adjusting the optical system to the thickness of the slide mount, and the positive film image frame is not always aligned to the first scanning plane due to the varying slide mount thicknesses.

In this film scanner, a conventional Kodak® Carousel 80 slide tray, or equivalent, is employed to select, position, and eject the individual slides to and from the first scanning plane relying on gravity feed and a conventional ejection mechanism.

In a further Kodak® RFS 2035 scanner, an auto feed slide device made by MARON, INC. feeds slides from a spring-loaded, horizontal hopper into a slide track. The parade of vertically standing slides move horizontally along their edge and are pushed out of the hopper and through a hopper slot with a shuttle device. The shuttle cannot feed slides from the hopper to the slide gate unless all the slides in the hopper are the same thickness and can pass through the hopper slot. The hopper slot can be manually adjusted for various slide thicknesses, but does not automatically do so. The slides are pushed toward the CCD area array so that one side of the slide mount is forced against a frame.

In the RFS 2035 scanner, the shuttle cycle time is set to insure a slide is present and aligned to the aperture during scanning. The slide device does not communicate with the Rapid Scanner and therefore cannot stop moving slides if any scanner error occurs. The scanned slides are pushed into another spring loaded horizontal hopper after scanning is completed.

Slide projectors made by Eastman Kodak Co., 3M, Inc., Bell and Howell, Inc., and other companies accept either a rotary or box type slide tray from which slides are fed into the projector. Shuttle mechanisms of various types are used to push a slide from the tray. For example, the KODAK® Carousel slide projectors rely on gravity for the slide to "fall" into the projector and uses a solenoid activated arm to lift the slide back into the tray. A slide projector does not move the slide once the slide has been inserted between the lamp and lens.

In contrast, in the film image scanners described above, it is necessary to move the slide relative to the linear illumination and CCD array and imaging components during scanning. An automatic slide loading and returning apparatus is needed to increase the slide scanning rate from that achieved with operator loading and removing of scanned slides.

SUMMARY OF THE INVENTION

Accordingly, it is an object of the present invention to provide an automatic, high speed slide transport and registration apparatus for loading slides from a slide tray into a slide scanning gate into registration with a scanning plane, scanning each slide and returning the scanned slide back into the slide tray slot.

It is a further object of the invention to ensure that the film image frame of a slide is in registration with a scanning plane in the slide scanning gate regardless of the thickness of the slide mount and is maintained there during translation of the slide relative to the components of the film scanner station.

It is another object of the invention to automatically center the slide in the slide scanning gate in the direction of translation regardless of variations in the dimension of the slide mount in that direction.

These and other objects of the invention are realized in a slide scanning apparatus and method of operation for automatically aligning a selected slide tray slot with the film scanning plane of a slide scanning gate of a translation stage of a film scanner, moving the slide into the slide scanning gate and returning the slide into the tray slot after the scanning process is completed. Such apparatus preferably further comprises a film scanner frame having an aperture therein aligned with the slide scanning gate for allowing the passage of a slide into and out of the slide scanning gate, slide tray positioning means formed in the film scanner frame for accepting a slide tray and aligning a slide tray slot with the aperture, slide tray moving means for moving a slide tray positioned by the slide tray positioning means to selectively align a tray slot with the aperture and the slide scanning gate of the film scanner, means for moving a slide from the aligned tray slot into the slide scanning gate, means for scanning the slide in the slide scanning gate, and means for returning the scanned slide from the slide scanning gate back into the aligned tray slot.

ADVANTAGEOUS EFFECTS OF THE INVENTION

The automatic system for loading, centering and ejecting slides into and from the scanning gate decreases the cycle time to digitally scan a batch of slides. In this regard, the self-centering of the mounted image frame reduces time spent focusing on the image plane. The apparatus in accordance with the invention should be able to scan 240 slides per hour. The elimination of manual slide feeding, centering and focusing reduces operator fatigue substantially. The improved performance is also due to improved automatic side-to-side centering of each scanned slide in the scanning gate, avoiding make-overs.

The present invention advantageously employs a rotating slide tray that is easily loaded with the film base and emulsion layers consistently oriented for optimum scanning. Slides are scanned in the same sequence as marked on the slide tray. The slide loading sequence is not lost, and the slides are put back into their original slot after scanning. This organization allows the operator to readily find a previously scanned slide and re-scan it if necessary.

Advantageously, such an automatic slide scanner may also be provided as an accessory to a negative filmstrip scanner that may be readily installed and removed from the scanner station in order to automatically scan photographic slides.

BRIEF DESCRIPTION OF THE DRAWINGS

Other objects, advantages and features of the present invention will become apparent from the following specification when taken in conjunction with the accompanying drawings in which like elements are commonly enumerated and in which.

DETAILED DESCRIPTION OF THE PREFERRED EMBODIMENT

The drawings depict the construction and operation of the preferred embodiment of the slide transport and scanning mechanism of the invention in the context of a permanent installation in conjunction with a filmstrip scanning transport mechanism of the type described in greater detail in the above-referenced applications as modified in the manner shown in FIGS. 2 through 8.

The filmstrip transport mechanism and the arrangement of the carriage and scanning gate frame supporting the filmstrip and slide scanning gates for movement into and out of the scanning station are described in the above-referenced '282 application. Therefore, only certain of the components of the negative filmstrip transport and scanner mechanisms disclosed therein are described herein as they relate to the automatic slide scanning components of the preferred embodiment of the present invention.

Figure 1:
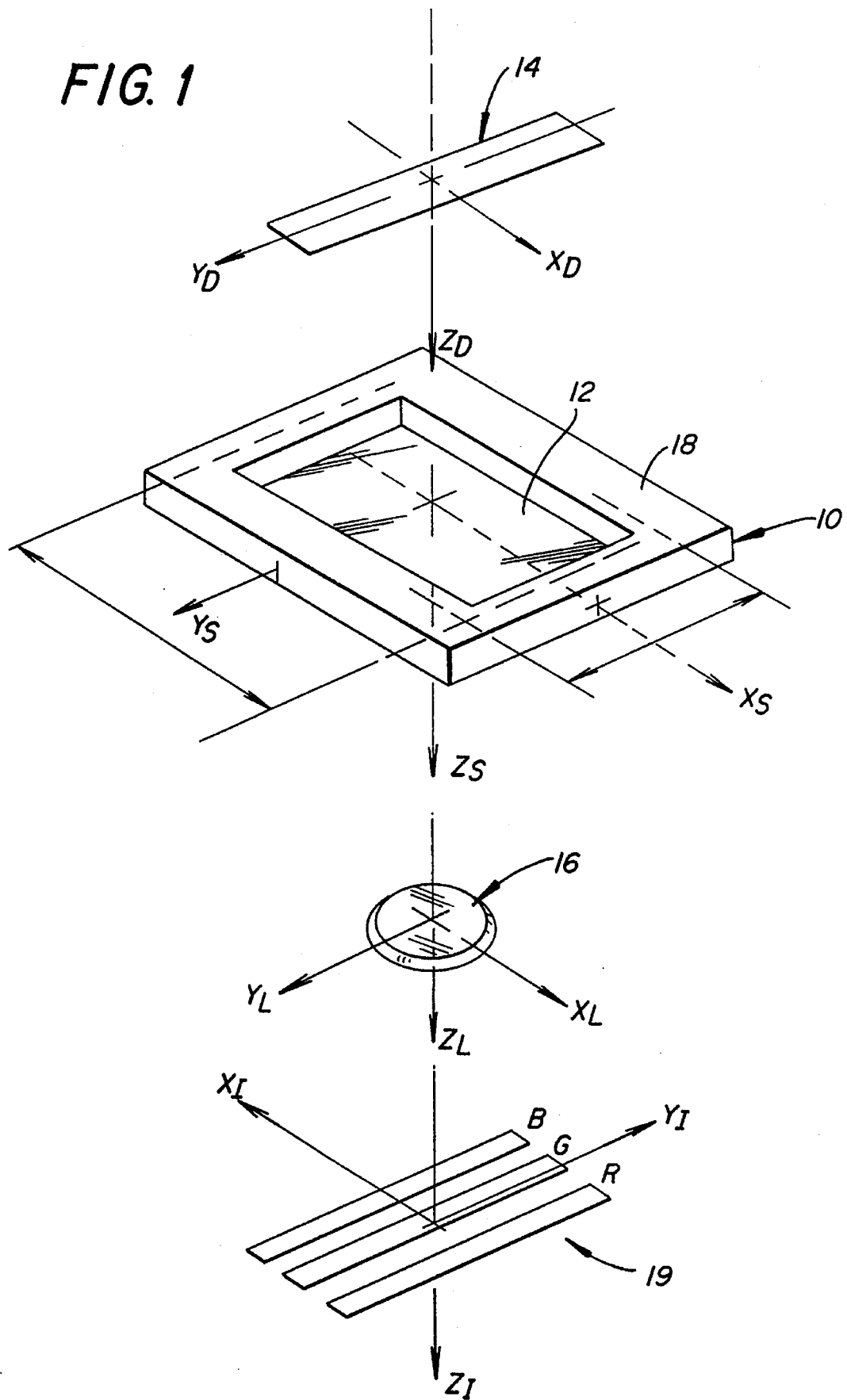
FIG. 1 schematically illustrates the relationship of the components of the film scanner station of FIGS. 2–6 with respect to a slide and showing the X-direction of translation from scan line-to-line, the Y-direction of line scanning and digitizing and the Z-direction of centering of the slide image frame in the slide scanner of the present invention.

Turning first to FIG. 1, it schematically illustrates the relationship of the components of a slide scanner of the type employed in conjunction with the apparatus of FIGS. 2–8 in relation to a mounted photographic transparency or slide 10. FIG. 1 shows the X-direction of translation of the slide 10 for focusing and for successive line scanning, the Y-direction of linear illumination, scanning and digitizing, and the Z-direction of aligning the slide image frame 12 to a scanning plane employing the apparatus of the present invention. The slide 10 is positioned horizontally in a slide scanning gate (not shown) between a diffuse, linear light source 14, a lens system 16 and a tri-color linear CCD array 19. The lens system 16 may be coupled to an auto-focus system of a known type to fine-tune the focus to account for bowing of the film image frame 12 within the slide mount 18. Linear CCD array 19 is of the type having closely spaced but separate, red, green and blue color filtered, rows of CCD elements that are electronically scanned to provide the R, G and B color signal values for each image pixel in each line scan that are digitized and stored for further processing as described above.

As described in the above-referenced '282 application, the slide 10 is automatically centered in the direction of translation, i.e., the X-direction, regardless of variations in the dimension of the slide mount 18 in the X-direction by operation of the film scanning gate. In addition, the slide 10 is automatically centered in the Z-direction regardless of variations of the Z-direction thickness of the slide mount 18, so that the slide image frame 12 is always in registration with a scanning plane in the slide scanning gate and aligned in the optical focus of the lens system 16 (except to the extent that the slide film may be bowed in the slide mount 18).

The system of FIG. 1 is embodied in the apparatus depicted in FIGS. 2–7, wherein the linear light source 14 emits the line of diffuse illumination in the Y-direction from the end of light bar 44 extending from an integrating cavity 40. Integrating cavity 40 preferably takes the form of that described in the above-referenced, commonly assigned and co-pending '775 application, wherein integrating cavity 40 has specific illumination characteristics suitable for illuminating the image frames of positive film slides and negative filmstrips and is mounted to swing out of the way during translation of the slide scanning gate. These details of operation of the integrating cavity 40 are fully described therein and are not important to an understanding of the present invention.

Figure 2:
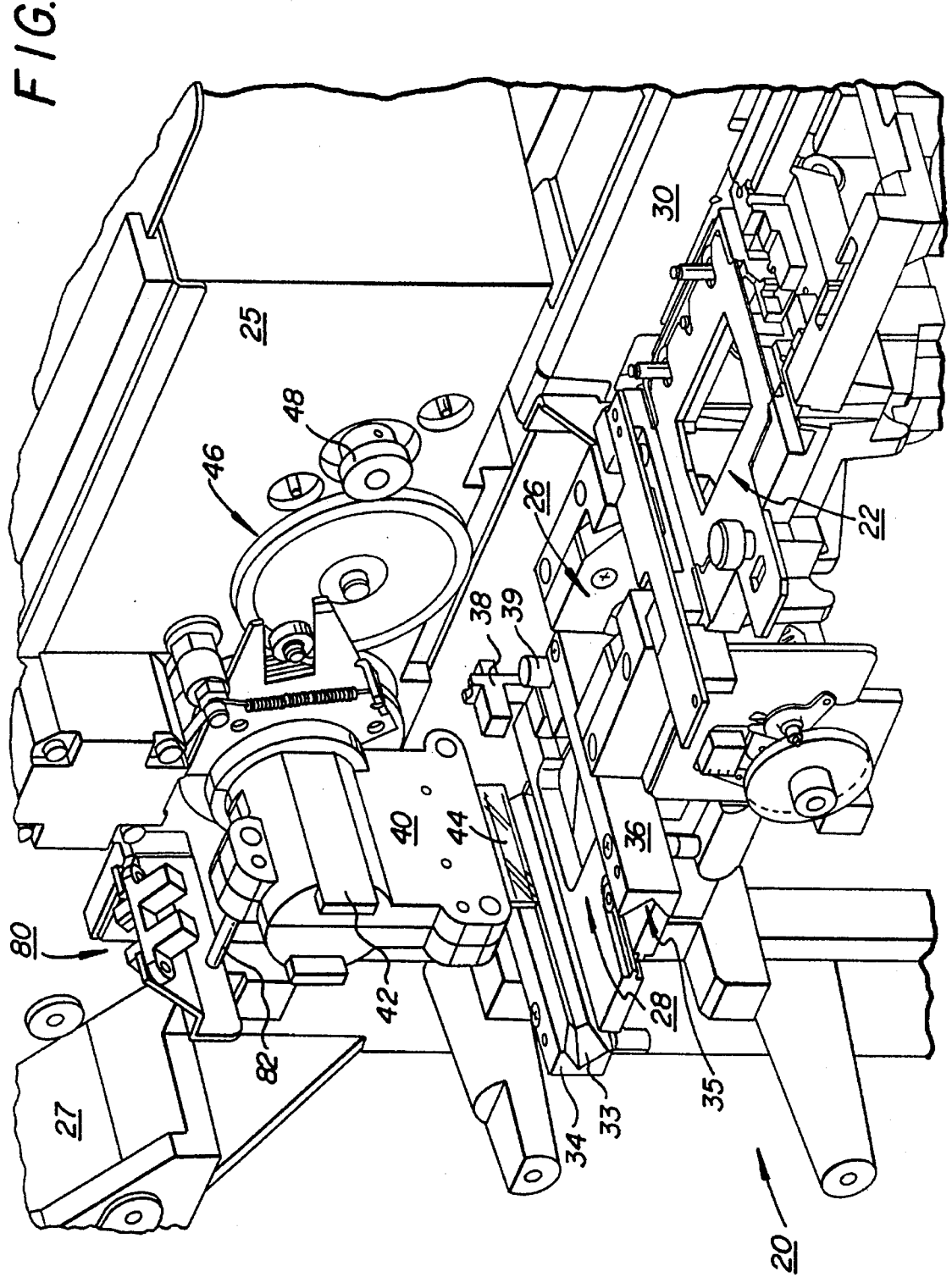
FIG. 2 is an isometric view of certain of the internal components of a film scanner in which the automatic slide transport and centering apparatus of the invention may be optionally placed.

FIG. 2 is a perspective view of the scanning gate frame 20 and carriage 30 in relation to the rotatable light integrator assembly 40 and a support bracket 27 for a particle transport roller (PTR) assembly (not shown) mounted to an interior support frame 25 of the filmstrip and slide scanner of the present invention. These interior components are virtually identical to those shown and described in the above-referenced, commonly assigned and co-pending '775 and '282 applications, incorporated by reference in their entireties. However, the slide scanning gate 28 and the slide insertion and removal slit described in those applications for the receipt, scanning and return of individual slides for manual removal have been altered in the present application. The similar structure will first be described to the extent necessary for an understanding of the present invention.

The elongated scanning gate frame 20 defines part of a filmstrip transport path and is made up of the negative filmstrip clamp and scanning gate 22, as well as a filmstrip take-up chamber (not shown) mounted at the right end thereof, and the filmstrip diverter 26 and slide scanning gate 28 to its left. The elongated scanning gate frame 20 is in turn supported by the carriage 30 that may be translated to the right and left with respect to frame 25 and in relation to the PTR assembly (not shown) and light integrator assembly 40 from the position shown in FIG. 2 under the control of the film scanning electronic control system in a manner and for reasons described below.

The filmstrip diverter 26 and the filmstrip clamp and scanning gate 22 shown in FIG. 2 and their operation are fully described in the '282 application in relation to a filmstrip transport path involving the PTR assembly. Very generally, in a film advance position of the diverter 26, a filmstrip (not shown) is advanced in a forward direction through film scanning gate 22 into a cavity in a take-up chamber (not shown) during a low resolution, pre-scan and digitization operation and then advanced out of the cavity in the reverse direction during the high resolution, main-scan operation. In the low resolution, pre-scan operation, the filmstrip is continuously advanced by a stepper motor through the film scanning gate 22 into the take-up chamber (not shown) with the film clamp lifted wherein filmstrip image frame borders are located. During the high resolution, main-scan operation, the image frames are successively withdrawn from the take-up chamber, centered with respect to the scanning aperture of the film scanning gate 22, and flattened by operation of the film clamp in a filmstrip scanning plane. The scanning gate frame 20 is translated on the carriage 30 by a further translation stepper motor (not shown) to a scan start position, and then the clamped image frame is scanned as the translation stepper motor is operated. As each image frame is scanned in the main-scan operation, the filmstrip is advanced through the diverter 26 to a filmstrip ejection chute (not shown).

As described in the '282 application more fully, the slide scanning mode may be selectively commenced whereby the scanning gate frame is translated from a slide insertion position for receiving a slide to a slide scanning position. In that process, the light integrator assembly 40 is pivoted out of the way to provide clearance of the diverter 26. The light integrator assembly 40 is described in detail in the above-referenced '775 application, incorporated herein by reference in its entirety. Light integrator assembly 40 includes a light integrator 42 having a sealed, cylindrical integrating cavity with a sealed input port for admitting filtered light from a high intensity source, all located behind the support frame 25. An elongated, sealed light emitting bar 44 extends downward from the integrator 42 adjacent to and across the width of the scanning aperture 47 of the slide scanning gate 28 to direct a line of light onto the film scanning plane. The light integrator 42 is pivotally attached to the support frame 25 to pivot about the sealed end port from the scanning position depicted in FIG. 2 into a standby position. In the standby position, the light bar 44 is pivoted away from the film scanning plane to be clear of interference with components of the elongated scanning gate frame 20. Then, the scanning gate frame 20 may be translated by stepper drive motor commands from the film scanning electronic control system to the carriage drive stepper motor (not shown) to position the slide scanning gate 28 in the scanning station during slide scanning.

FIG. 2 also depicts a pivoting assembly 46 for effecting the pivotal movement of the integrating cavity 42 and bar 44 between the standby and scanning positions. The pivoting assembly 46 is driven through a plate and gear arrangement coupled to the gear drive gear 48 of a stepper motor located behind frame 25 described in greater detail in the above-incorporated '775 application.

In summary of that description, when movement of the light integrator 42 and conducting bar 44 to the standby position is commanded by the film scanning electronic control system to translate the scanning gate frame 20, the gear drive stepper motor coupled to drive gear 48 is energized by stepper pulses from film scanning electronic control system to rotate clockwise. Light integrator 42 and bar 44 pivots clockwise against the force of the spring from the scanning position shown in FIG. 2 to a standby position. The number of stepper drive pulses delivered during the movement is counted by the electronic control system.

In order to provide control and feedback, an electro-optical position sensor 80 is provided as shown in FIG. 2 mounted to the frame 25. Normally the output signal of the sensor 80 is present when the dowel pin 82 extending from the upper tab area of the integrator 42 is in the scanning position depicted in FIG. 2. When the dowel pin 82 moves with rotation of the integrator assembly 40 to the standby position, it interrupts the output signal of sensor 80. The drive pulses to the drive gear 48 stepper motor are halted, and the count of stepper drive pulses delivered is saved. The drive gear stepper motor locks the drive gear 48 which in turn holds the light integrator assembly 40 in the standby position against the return force of the spring.

When the return to the scanning position is commanded, the stepper motor is energized to rotate the drive gear 48 in the opposite direction for a number of stepper drive pulses equaling the saved count. The integrator assembly 40 is rotated counter-clockwise by that number of stepper drive pulses to the scanning position. Calibration of the operation can be accomplished by adjusting the position of sensor 80 and components of the pivoting assembly 46.

This operation is employed in the present invention to position the slide scanning gate 28 or the filmstrip scanning and clamp gate 22 into the scanning plane position schematically depicted in FIG. 1. In the following description, it will be assumed that such an operation moving the slide scanning gate 28 into the scanning plane position has been effected as shown in FIG. 2.

As noted above, the slide scanning gate 28 of the present invention and its orientation with respect to the scanning gate frame 20 differs from that shown in the above-incorporated applications. Rather than being attached to the scanning gate frame 20 to receive slides inserted in the direction of translation, the jaws 34 and 36 thereof are aligned at right angles to the direction of translation to receive slides inserted in a manner described below.

In FIG. 2, the slide scanning gate 28 is therefore depicted in alignment with the light integrator assembly 40 to allow scanning of a slide that is inserted into the jaws 34 and 36 thereof at right angles to the direction of translation during scanning. During such scanning, the scanning gate frame 20 supported by the carriage 30 is translated to the right and left with respect to a slide insertion and ejection position and in relation to the light integrator assembly 40 in a low resolution and a high resolution scanning mode. It will be understood that the lens system 16 and tri-color CCD linear array 22 of FIG. 1 are positioned below the negative film scanning gate 80. All of these components are located within an external housing of the film scanner and are accessible through a film scanner access door 102 in the housing 100 (shown in FIG. 4).

Initially, the slide scanning gate 28 is centered in the scanning station so that the film scanning electronic control system can initiate aperture and focus setting of the scanning lens assembly. Then, during both the pre-scan and main-scan, the scanning gate frame 20 and carriage 30 are translated through the scanning station the width of an image frame to derive the low and high resolution scan data.

In this regard, the scanning gate frame 20 is driven by the carriage stepper drive motor (not shown) to translate in the forward X-direction (i.e. to the right) to advance the slide scanning gate 28 and slide 32 through the scanning station to perform the pre-scan thereof. Upon completion of pre-scan, the carriage 30 and scanning gate frame 20 is driven in the reverse direction to re-position the right side of the slide scanning gate 28 in line with the light conducting bar 44. Then the scanning gate frame is translated again in the forward direction past the light conducting bar to perform the main-scan of the slid image frame. After main-scan is completed, the scanning gate frame 20 is translated in the reverse X-direction to present the scanned slide at the slide insertion/ejection position for ejection back into the slot of the slide tray as described below.

Figure 3:
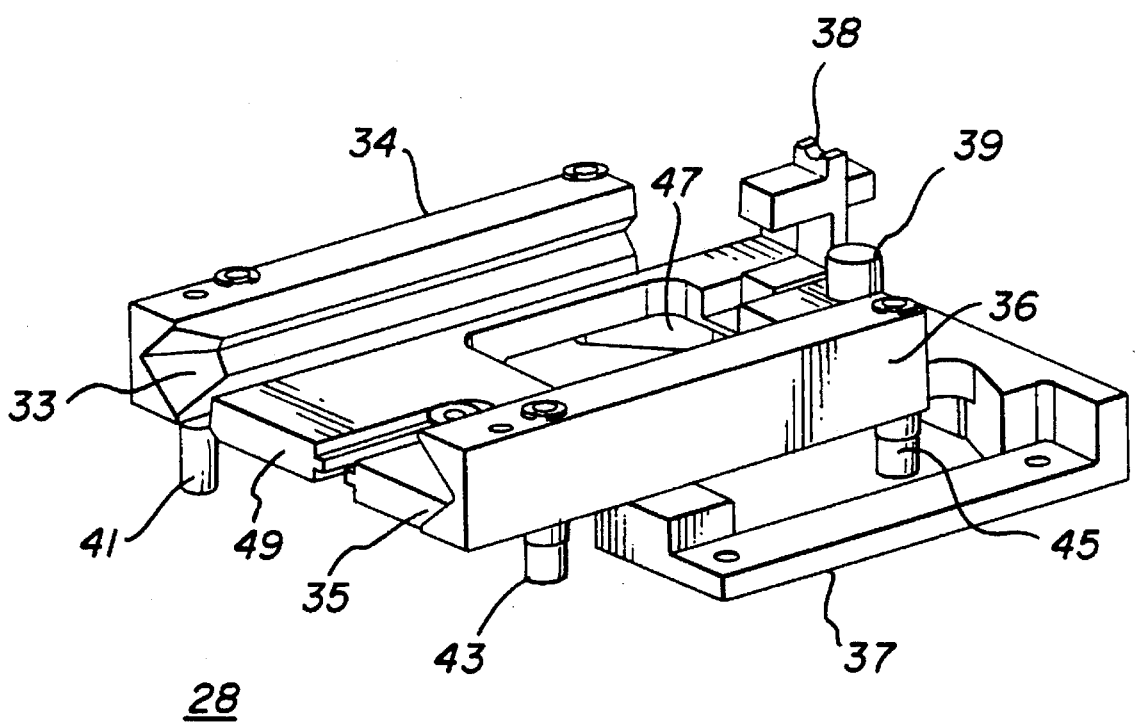
FIG. 3 is an isometric view of the self centering, slide scanning gate mechanism of FIG. 2.

The slide scanning gate 28 is also shown in the perspective view of FIG. 3. The slide scanning gate 28 is constructed in the same fashion as described and depicted in the above-incorporated '282 application except for the right angle orientation. The slide scanning gate 28 is constructed to receive slides 10 having slide mounts 18 varying in width and thickness and to center the slide film image frame in the film scanning plane despite the variations in slide mount widths and thicknesses in order to decrease the need to adjust focus of the scanning lens system. When slide scanning is commanded and a slide 10 is loaded between jaws 34 and 36, the slide presence is sensed by the slide present sensor 38, and the "slide present" signal is provided to the electronic control system to control operations described below.

After scanning and digitizing is completed, the film scanning electronic control system provides an ejection signal to a return arm drive motor (not shown) that pivots a return arm (not shown) to eject the slide from the jaws 34 and 36 in a manner described below. The process of inserting and scanning a further slide may be repeated while the slide scanning gate 28 remains in the scanning plane position.

Slide mounts are of various thicknesses and vary in outer dimensions sufficiently that errors may occur in the scanning beam focus and in side to side centering of the film image frame in the slide scanning gate. These errors may or may not show up in the video pre-scan display for the operator to correct. Time may be lost in re-focusing and re-scanning such slides. In order to avoid losing time in re-focusing the lens assembly 132 and re-centering the slide frame, the slide gate 28 is configured to automatically center such slides in both the thickness and width dimensions as described in the above-incorporated '282 application.

The slide scanning gate 28 has specific centering features to accommodate and center such differing dimension slide mounts and to align the film image frame with the film scanning plane. The jaws 34 and 36 are formed with V-shaped notches 33 and 35, respectively that receive and center the slide mount 18. The jaws 34 and 36 are mounted above the base 37 that is attached to the diverter 26 to swing outward equally against a spring force when the slide 10 is slipped into the V-shaped notches 33 and 35. The jaws 34 and 36 are suspended with respect to aperture plate 45 by four pivot arms (not shown) coupled to pivot links 41, 43 and 45 (one obscured). A spring force (not shown) draws the jaws 34 and 36 together to a spacing that is less than the width of a typical slide mount 18.

Figure 8:
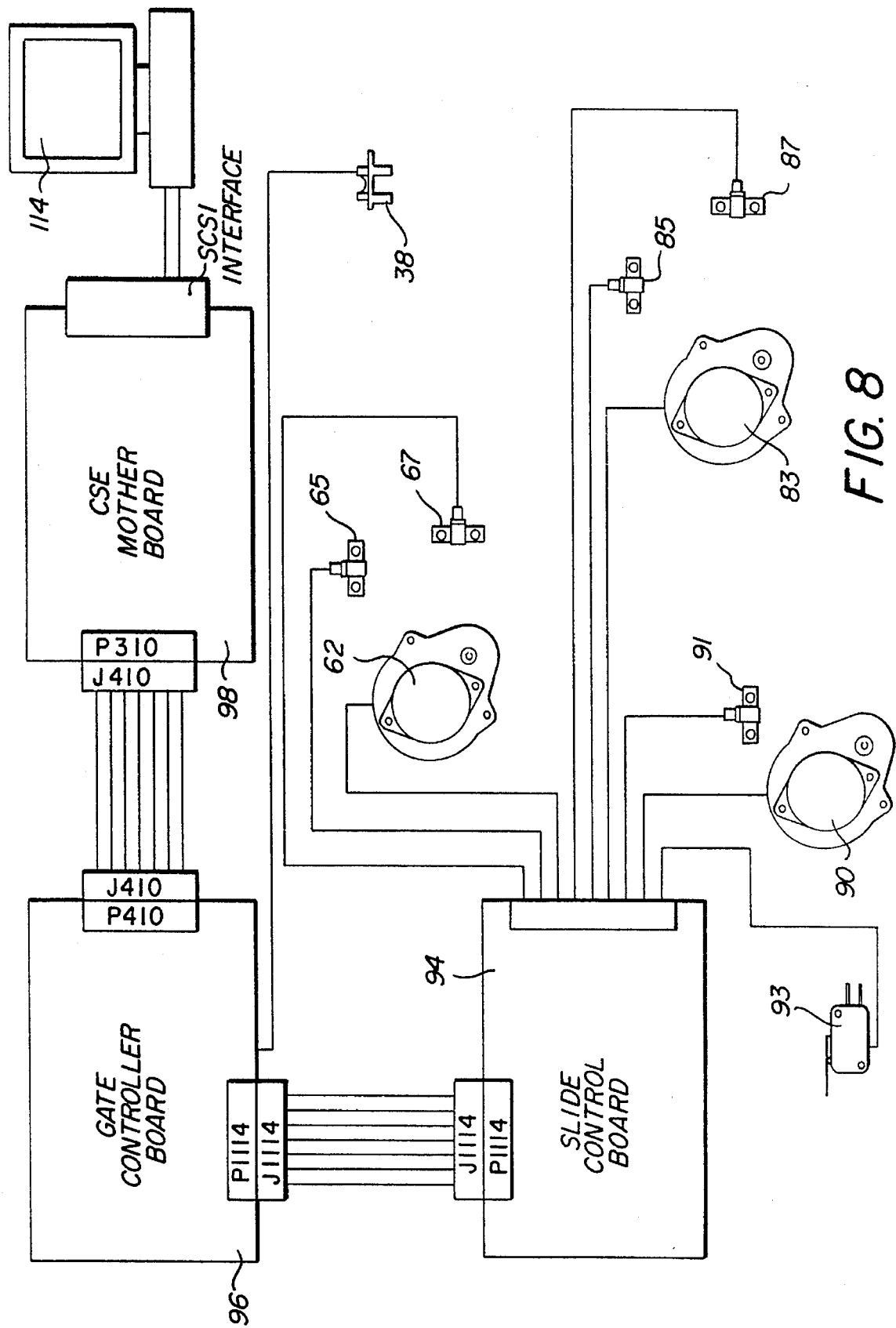
FIG. 8 is a schematic diagram of the electronic control system for rotating the slide tray, inserting a slide into the slide scanning gate, scanning the slide and returning the scanned slide back into the slide tray slot.

When fully inserted, the slide mount 18 is abutted against a stop pin 39, and the slide film image frame 12 is centered with respect to the aperture 47. A corner of the slide mount 18 interferes with the light beam of the electro-optical sensor 38 which provides the slide present signal to the electronic control system as shown in FIG. 8 to initiate slide scanning operations described above.

Figure 4:
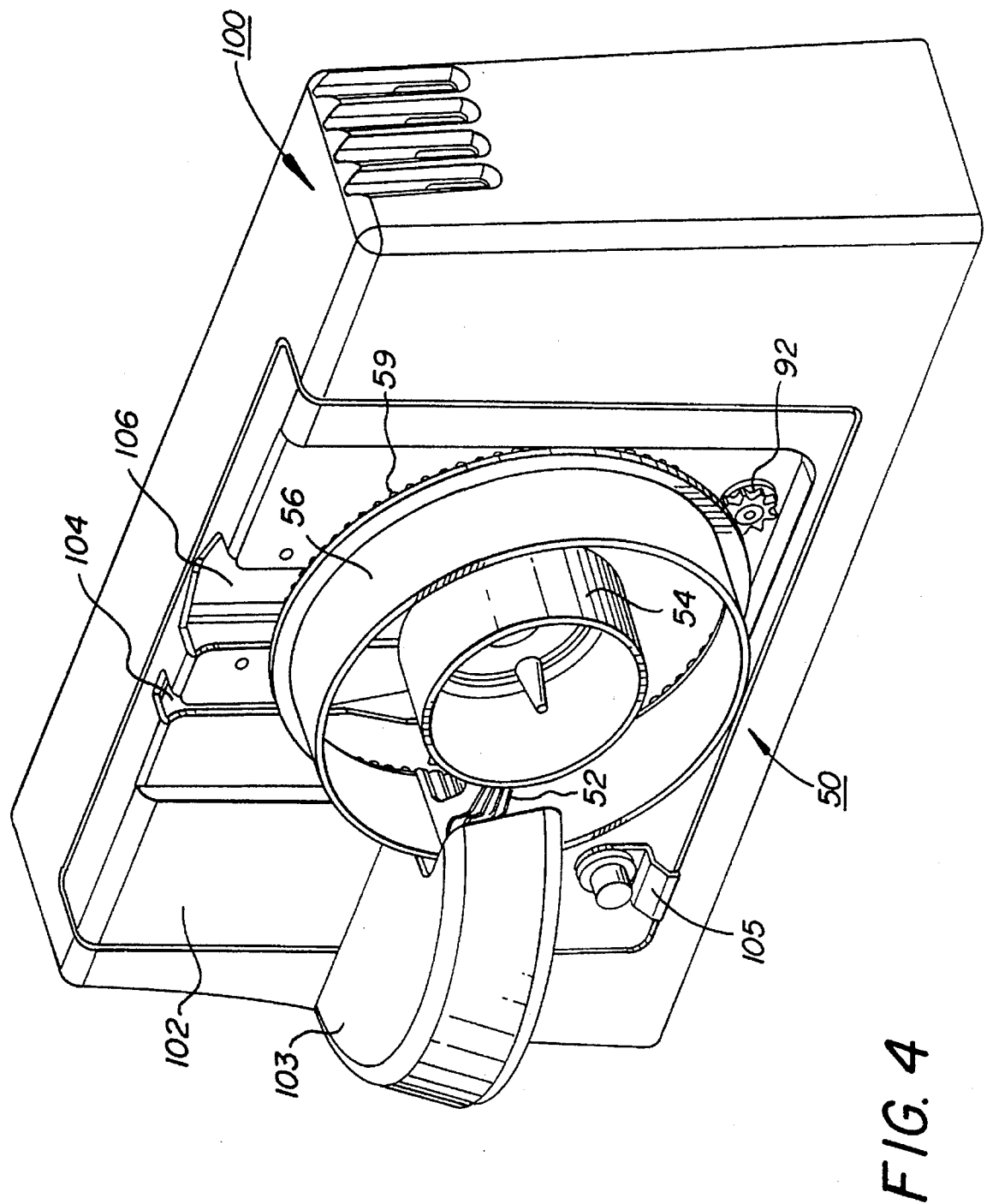
FIG. 4 is an isometric external view of the slide tray mounted to an access door of the housing of the film scanner and the projecting load arm.

Turning to FIG. 4, the external components of the automatic slide scanning system of the preferred embodiment of the invention are depicted in relation to the scanner housing 100 and a slide tray 50 mounted to the scanner access door 102. A shroud 103 attached to the scanner access door 102 is provided to shield the slide load arm 60 (shown in FIG. 6) from potential damage. The slide tray 50 is shown in a skeletal outline with only a few webs 52 shown between the inner and outer ring walls 54, 56 defining the slide tray slots. The circular base 51 of the slide tray 50 is also partially removed to expose the underlying structure formed in the access panel or door 102 in the housing 100. The access door 102 allows access to the film scanning components of FIG. 2 when the latch 105 is released and the door 102 is swung open on its hinge assembly 110 (shown in FIG. 6).

The rotary slide tray 50 may be a conventional Kodak® Carousel 80 slide tray, or equivalent that has the 80 slide accepting slots formed between the webs 52 extending between the inner and outer ring walls 54, 56. A circular lower base plate 51 and a detachable upper ring (not shown) that is attached on top of inner wall 54 after slides are inserted in the slots retains the slides in the slots for storage. A catch mechanism (not shown) interconnects the lower base plate 51 with the inner ring wall 54 to prevent rotation of the lower base plate 51. The catch mechanism can be released by attachment of the slide tray 50 to a slide projector hub to allow rotation of the walls and webs defining the slide accepting slots with respect to a slide aperture in the stationary circular base plate 51 as described below.

Ordinarily, such rotary slide trays are mounted horizontally to the drive hub of the slide projector to release the catch mechanism and rotate each slide slot in turn into position with respect to the aperture in the base plate 51 that is aligned to a light projection guide. Each aligned slide falls by gravity through the slide aperture into the light projection guide, and the illuminated image is projected by the optical system onto a screen for viewing. An electromagnetic ejector arm is triggered to eject the slide upward and back into the slot as a slide tray rotation motor is energized to rotate the slide tray to the next slot.

Figure 5:
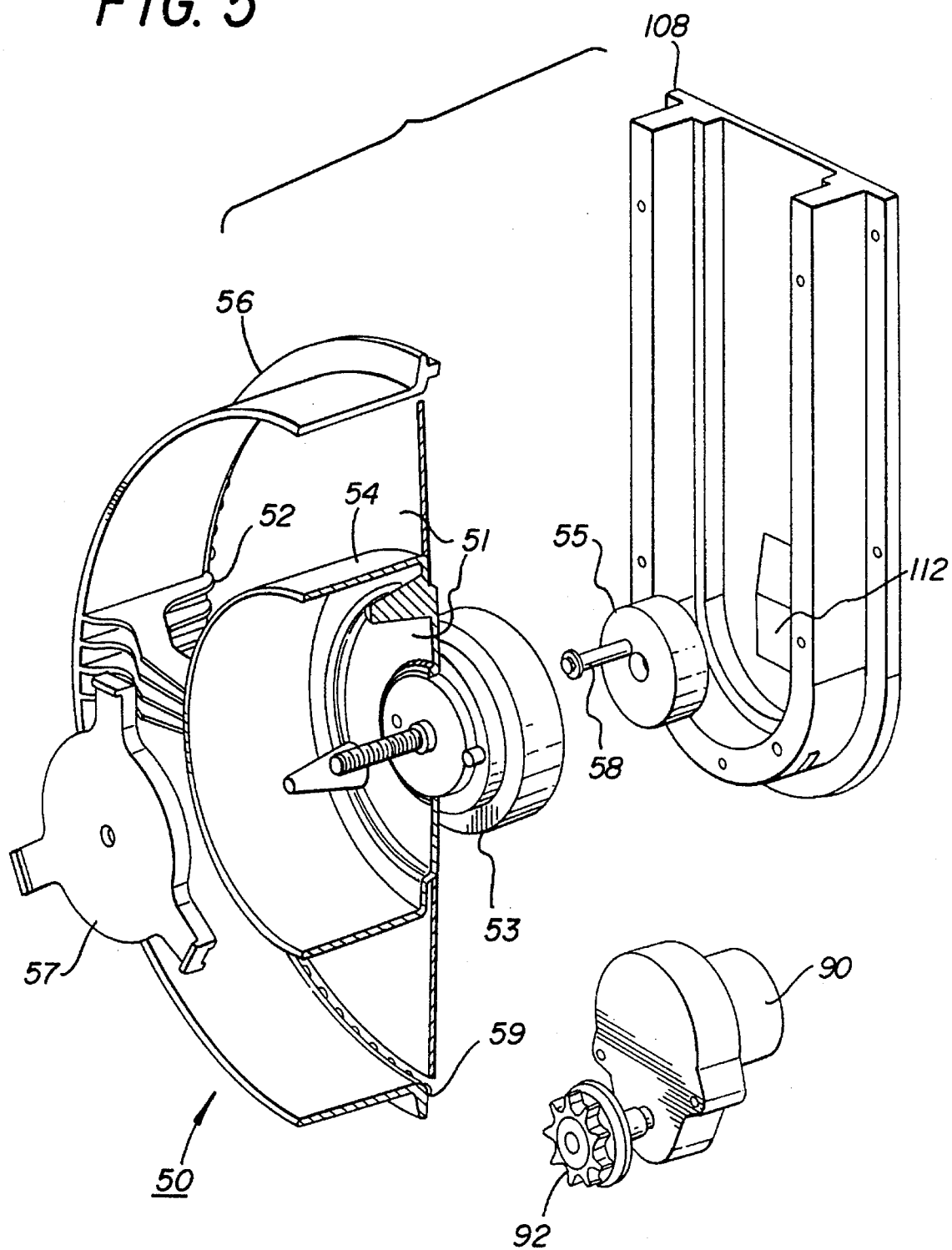
FIG. 5 is an isometric exploded partial view of the slide tray in relation to an adaptor for attachment of the slide tray to the access door and to the tray rotation motor.

In the preferred embodiment of the present invention, the slide tray base 51 is attached at its central opening to an adaptor 53 and plunger 55 as shown in FIG. 5 in order to hold the slide tray 50 vertically in a U-shaped inner drive plate 108 located on an internal frame 70 (shown in FIG. 6) behind an elongated slot 106 to the door 102 as shown in FIG. 4. The adaptor 53 fits into the standard opening of the slide tray 50 in a non-rotatable manner and is locked there by the nut 55.

In FIG. 5, the cut away portion of the slide tray 50 including base 51 is shown in relation to the tray drive adaptor 53, a plunger 55 and pin 58, and the attachment nut 57, as well as the tray drive stepper motor 90 and drive gear 92. The adaptor 53 has an outer diameter that fits within the U-shaped inner drive plate 108 and bears against the inner surface of scanner access door 102 when loaded from the top opening of slot 106 and thereby holds the slide tray assembly in place. The plunger 55 fits axially within a recess in the adaptor 55, and the pin 58 extends through a hole in the adaptor 55 and rearwardly from the back of the plunger 55 to bear against the cam surface 112 and fit into a detent (not shown) in surface 112 when the assembly is fully seated. The pin 58 is spring loaded within the hole that it extends through in plunger 55 so that it is pressed forward as it rides on the cam surface 112 when the assembly is fully seated. The catch mechanism in the Carousel 80 slide tray is engaged by the forward movement of the pin 58 and released to allow rotation of the outer and inner ring wall assembly of the slide tray 50 with respect to its base plate 51 and its slide aperture.

In this fashion, the slide tray 50 is free to be rotated by the slide tray motor 90 to position a selected slot into alignment with the opening in the slide tray base 51 and the slide scanning gate. When the slide tray 50 is so positioned by the adaptor 53 and plunger 55 in the slot 106, a slide tray present switch (not shown) is also closed. At the same time, the slide aperture (obscured from view) in the base 51 through which slides normally fall is aligned with an aperture in the access door 102 and with the plane of the jaws 34 and 36 as well as the plane of the slide load arm 60.

In that position, tray drive gear 92 also engages with tray teeth 59 formed in the base of the outer side wall 56. The drive gear 92 extends through an opening 78 in the access door 102 as shown in FIG. 4. Rotation of the tray stepper drive motor 90 causes rotation of the tray 50 with respect to its stationary base 51 to align a particular slide containing slide slot with the slide aperture in the base 51 and the further slide aperture in the access door 102. The so-aligned slide containing slot is thus also aligned in the plane of the load arm 60 (shown in FIG. 6) within the shroud 103. A optical pulse counter 91 tracks rotation of an encoder wheel 95 during rotation of the tray drive gear 92 by the tray drive stepper motor 90.

Individual slides in slots in the rotary slide tray 50 may be horizontally loaded into the slide gate jaws 34 and 36 by the slide load arm 60 (shown in FIGS. 6 and 7) and returned into the same slide tray slot by a return arm 81 (shown in FIGS. 6 and 7) within the housing 100. Once so positioned, the slide tray 50 is rotatable step-wise to successively present each slide 10 in each slide slot of the tray 50 or to selectively present a selected slide 10 into position to be loaded through an opening in the door 102 and into the slide scanning gate of the film scanner station 20 to be scanned.

Figure 6:
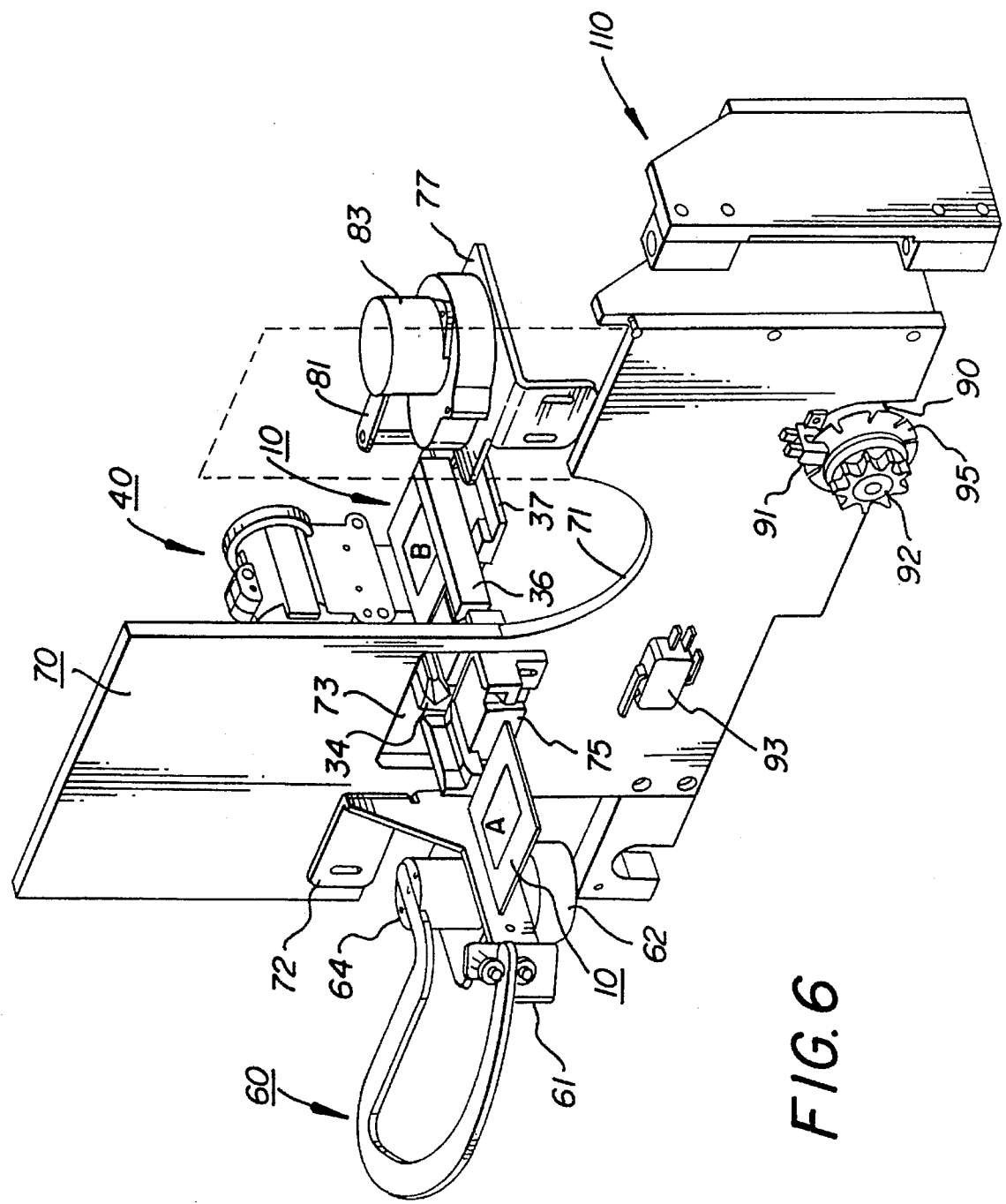
FIG. 6 is an isometric view of the internal components of the slide load and return mechanism of the invention.
Figure 7:
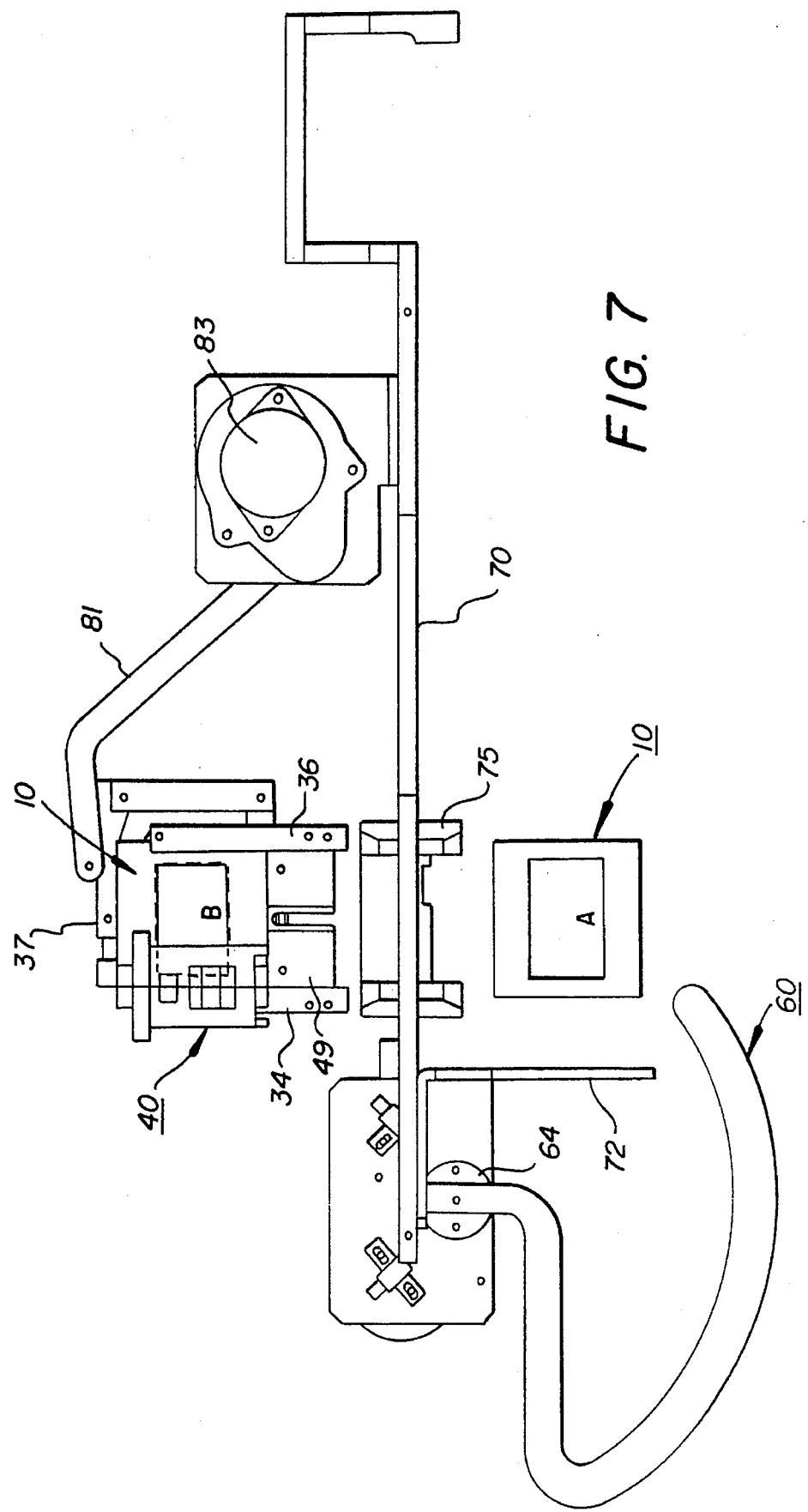
FIG. 7 is a top view of the slide load and return mechanism of FIG. 6.

Turning to the internal components of the slide transport mechanism, FIGS. 6 and 7 depict certain of the major sub-systems of the slide transport mechanism located in reference to a further support frame plate 70 (partly cut away) that is located just behind the scanner access door 102. FIGS. 6 and 7 show the slide load and return mechanisms for inserting and ejecting a slide 10 from a slide tray position A into a slide scanning position B in the slide scanning gate 28 of the present invention. The light integrator 40 is shown for reference purposes, but the other structure of FIG. 2 is removed to visualize the slide insertion/ejection mechanism. The slide tray 50 and other components of FIGS. 4 and 5 are also omitted for clarity of view of the internal components of the slide transport mechanism.

The U-shaped drive plate 108 of FIG. 5 is attached to the support frame plate 70 in the U-shaped aperture 71. A slide aperture 73 formed in plate 70 includes a slide guide 75 aligned between the slide tray position A of the slide tray slot and the slide scanning position B in the slide scanning gate 28 for supporting the slide as it is loaded into the slide scanning position B and returned to the slide tray position A.

The load mechanism includes the load arm 60 which is attached to a load arm drive motor 62 through a semi-rigid coupling 64 and the load arm home sensor 65 and load arm away sensor 67 shown schematically in FIG. 8. The semi-rigid coupling permits the load arm 60 to over travel slightly to compensate for the variation in slide to slide length in the Y-direction. The load drive motor 62 is mounted to a flange 72 of support frame 70 and is operated by the electronic control system of FIG. 8 in a manner to be described. A vertical guide plate assembly 61 (shown only in FIG. 6), including a pair of roller guides, is attached to the flange 72 to contact and guide the upper and lower Sides of the free end of the load arm 60 to assure that it remains in a path of travel assuring contact with the edge of the slide 10 to be inserted into the slide scanning gate.

The slide return mechanism includes the slide return arm 81 which is attached to a return arm drive motor 83 through a further semi-rigid coupling 84 and the return arm home sensor 85 and return arm away sensor 87 shown schematically in FIG. 8. The semi-rigid coupling 84 permits the return arm 81 to over travel slightly to compensate for the variation in slide to slide length in the Y-direction. The return drive motor 83 is mounted to a flange 77 of support frame 70 and is operated by the electronic control system of FIG. 8 in a manner to be described.

When the load drive motor 62 is operated, the load arm 60 pivots counter-clockwise, pushing the slide 10 out of its slot in the tray 50, i.e. position A, through the slide guide 75, and into the jaws 34 and 36 of slide gate 28 in position B, and then pivots clockwise back to the load arm home position. The slide gate 28 is positioned in the load and eject position in the Y-direction at this time and receives and centers the slide 10 in the X-direction and the Z-direction of FIG. 1. When loaded, the slide 10 is positioned against the stop 39 and interrupts the slide present sensor 38 of FIG. 3 to provide the slide present signal.

After the slide 10 is loaded into position B, the slide scanning gate 28 is translated in the X-direction under the control of electronic control system in the manner described above. The slide image frame 12 is scanned in successive low resolution pre-scan and high resolution digitizing scan during successive translations in the X-direction.

The return mechanism pushes the slide 10 from the slide scanning position B in slide scanning gate 28 and back into its slot in the slide tray 50 of slide position A after scanning is completed. In this process slide scanning gate 28 first returns to the initial load/eject position in the Y-direction so that the jaws 34, 36 are aligned with the slide guide 75 as shown in FIG. 7 upon completion of the high resolution scan. The return arm 81 is pivoted counter-clockwise by the return drive motor 83 when the return drive motor 83 is energized by the electronic control system. The return arm 81 pivots counter-clockwise from the rest position depicted in FIGS. 6 and 7 and pushes the slide 10 back out of the slide scanning gate 28 and into the aligned slot in the slide tray 50 as described further below.

These operations are completed employing signals derived from the slide present sensor 38, the load arm home and away sensors 65, 67, the return arm home and away sensors 85, 87, the slide tray rotation pulse counter 91 and the slide tray present switch 93, as well as signals derived from completion of the slide scanning operations, processed by a slide control board 94, gate controller board 96 and the CSE "mother" board 98 of FIG. 8. FIG. 8 does not depict all of the input signals and drive motors etc. of the entire electronic control system of the film scanner, but depicts the major system boards through which the slide scanning operations of the present invention are controlled. The slide control board 94 controls all movements of the slide tray 50 and the slide load and return arms and receives the sensor signals. The gate controller board 96 controls the film strip scanning mode operations. The CSE mother board 98 controls the carriage drive and scanning light source during scanning operations, processes the image scan data and controls communications with the host computer 114 external to the scanner.

The electronic control system of FIG. 8 thus receives commands from the scanner control panel through the host computer 114 and activates the proper sequence of mechanical movements to effect slide transport and slide image frame scanning by commands communicated through the CSE mother board 98, the gate controller board 96 and the slide control board 94. In the process, the position sensors may also generate error signals that can be signaled through the communication links to the host computer 114 and to the operator. The operating method employing the electronic control system described above interconnected in the manner of FIG. 8 is as follows.

When a set of slides $10_1$-$10_n$ are to be scanned, the slides are cleaned and properly oriented into the slide tray at a "prep station". A single slide tray 50 may be filled with slides of a single type, manufacturer and customer order, and all of the loaded slides may be scanned after entry of the identification data. Alternatively, the electronic control system can be instructed by the operator to effect scanning of only selected slides from the tray, and the order of scanning may be selected by entering appropriate instructions through the host computer 114.

In addition, a slide tray 50 can be loaded with more than one customer order and with different types of film base by different manufacturers in each order, as long as data is entered by the operator at the control panel for use in adjusting scanning light color balance and for tracking orders. The data includes the type and manufacturer of slides (e.g., Kodachrome, Ektachrome, or Fuji, Agfa, etc.), which slots of the tray are empty, customer ownership of the slides in each slot (particularly when writing Photo-CD Disks; may not be needed when making prints from slides), as well as the slide tray identification number.

This data is stored in the film scanner's host computer 114 and is retrieved and used by the electronic control system when scanning a particular tray of slides. The electronic control system is instructed by the data entered as to which empty tray slots to skip, when to tell the operator to change a Photo-CD disk for the next customer order and what color balance table to load for the film type being scanned.

A typical input spreadsheet of the type shown below in Table I is used to enter the needed data at the prep station for a tray with an ID # A235, for example:

TABLE I

TRAY ID # A235:

| Slot No. | Full/Empty | Film Type | Customer ID |
| --- | --- | --- | --- |
| 1 | full | Kodachrome | bb3456 |
| 2 | full | Kodachrome | bb3456 |
| 3 | full | Fujichrome | bb3456 |
| 4 | full | Ektachrome | bb3456 |
| 5 | full | Kodachrome | bb3456 |
| 6 | full | Kodachrome | bb3456 |
| 7 | empty | | |
| 8 | full | Ektachrome | cd9873 |
| 9 | full | Ektachrome | cd9873 |
| 10 | full | Ektachrome | cd9873 |
| 11 | empty | | |
| 12 | full | Ektachrome | cr7265 |
| 13 | full | Ektachrome | cr7265 |
| 14 | full | Kodachrome | cr7265 |
| . | | | |
| . | | | |
| . | | | |
| 78 | full | Fujichrome | vg6217 |
| 79 | empty | | |
| 80 | empty | | |

The operator then enters a command on the control panel confirming the identity of the tray of slides to be scanned, and the data described above is called up or loaded to provide a set of operating instructions to the electronic control system boards 94, 96 and 98. The slide scanning gate is positioned in the scanning station, and the position is confirmed to the host computer 114. The loading and ejecting mechanisms are initialized in response to insure that the load arm 60 and the slide scanning gate 70 are in their "home" positions, as shown in FIGS. 6 and 7 and confirmed by sensors 65 and 85, and ready to place a slide in position A respectively. The return arm 84 is moved clockwise a short distance out of the home position depicted in FIG. 7 to an "away" position of FIG. 6, confirmed by return arm away sensor 87, during loading of a slide 10. The slide gate 28 is then ready to accept the loading of a slide 10.

The host computer display then signals the operator that the prepared slide tray 50 can be inserted in slot 106. When the slide tray 50 is inserted in the manner previously described, the "slide tray present" switch 93 signals to the slide control board 94 that the loading and scanning steps can begin if the data has been entered and when the operator commands scanning to commence.

After the operator initiates slide scanning, the slide tray 50 is rotated counter-clockwise to the first slide slot position by the tray drive stepper motor 90 rotating the tray drive gear 47 of FIG. 5. The tray drive stepper motor 90 is controlled by a feedback system in slide control board 94 that receives the pulse count from the pulse counter 91 to halt the stepper motor 90 when the proper position is reached. The load arm drive motor 62 is then energized to rotate load arm 60 from its home position to push a slide 10 from the slot in tray 50 (position A) into the slide scanning gate 70 and into contact with post 39 (position B). The slide mount 18 interrupts the slide present sensor 38 that provides the slide present signal to the gate controller board 96. The slide control board 94 responds by providing a reverse drive signal to the load drive motor 62, and the load arm 60 quickly rotates clockwise back to its home position, detected by the load arm home position sensor 65.

The control of the slide scanning operations is then assumed by the electronic control system, particularly the gate controller board 96 and CSE mother board 98. The specific position sensors and carriage motor drive signals employed in these operations are not important to the present invention and are not shown in FIG. 8, but may be found in the above-incorporated '282 application. The translation stage 30 then is energized to move the linear film scanning gate frame 20, including the slide gate 28 and slide 10, back and forth in the X-direction of FIG. 1 from the slide load and return position B to effect the focus, pre-scan and main-scan operations. To summarize these scanning operations, first the carriage motor is energized to move the slide scanning gate halfway along the length scanned in the positive X-direction to a central focus position and to stop momentarily for the lens system 16 (FIG. 1) to focus on the slide image frame 12. On completion of focusing, the electronic control system operates the translation stage 30 to move the slide scanning gate 28 back to its initial position. Then, the electronic control system operates the translation stage 30 to move the slide scanning gate frame 20 in the X-direction to pre-scan the image frame at low resolution so that color balance and film type information may be determined and recorded for use in processing the three color data for reproducing the scanned image in other media, in a manner known in the art. After this pre-scan operation, the slide 10 is again translated back to the original position, halted and translated again during a main-scan operation in high resolution mode to derive the image information used in digitization and reproduction of the image.

When the high resolution main-scan is completed operating command is returned from the gate controller board 96 to the slide control board 94. The slide control board 94 provides a return drive signal to the return arm drive motor 83 to swing return arm 84 counter-clockwise from its "away" position. During this movement, return arm 84 pushes the slide 10 in the Y-axis direction back into its original slot in tray 50. The return arm 84 then makes the return arm home sensor 85, and the resulting signal to the slide control board 94 indicates that the slide 10 is back in the slot in the tray 50 (at position A as shown in FIGS. 6 and 7). A reverse drive signal is then applied by slide control board 94 to return drive motor 83, and the return arm 84 immediately swings back clockwise to the return arm away position sensed by the return arm away sensor 87. The return arm away signal causes the slide control board 94 to halt the drive signal to the return drive motor 83.

The status of the home and away sensors 65, 85 and 67, 87 and the slide present sensor 38 are checked, and if they indicate that the return and load arms are back in the initial positions and that the slide scanning gate is empty, the entire cycle described above is reinitiated. The slide control board 94 causes the slide tray drive motor 90 to rotate the tray 50 until the next slot containing a slide to be scanned is aligned to the load arm 60, the slide scanning gate 28 and the return arm 84, and the cycles continue until all the slides have been scanned. However, focusing the lens system 16 on each slide of a particular tray may not have to be done. Once a complete tray has been scanned, the tray drive motor rotates the tray 50 to its initial or "zero" position with respect to the base 51. The operator can remove the tray 50 by lifting it and the attached adaptor 53 and plunger 55 upward through the frame insert drive plate 108 and slot 106.

Thus the apparatus of the present invention embodied in the preferred embodiment described above provides an automatic, high speed slide transport and registration apparatus for ensuring that the film image frame of a slide is in registration in a scanning plane at a fixed distance from the diffuse illumination light source and other scanner station components regardless of the thickness of the slide mount and is maintained there during translation of the slide relative to the scanner station components.

Although the slide scanner apparatus and methods of the present invention have been described in the context of a fully dedicated automated slide and filmstrip scanner, it will be understood that the automatic slide scanner as described above may be provided as an accessory to the scanner described in the above-referenced applications. It will be understood that the slide transport and scanning mechanism of the invention to effect automatic slide scanning may be substituted for the single slide scanning system disclosed in these applications by substituting the right angle slide scanning gate 28 at the end of the scanning gate frame 20 and providing the substitute access door 102 and components mounted to the frame 70 behind the door as shown in the Figures described above. In such a case, the negative filmstrip transport path with respect to the image frame scanning gate of the type depicted in FIG. 2 is retained for scanning filmstrips.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–8 slide 10
slide image frame 12
diffuse, linear light source 14
lens system 16
slide mount 18
tri-color linear CCD array 19
linear film scanning gate frame 20
filmstrip clamp and scanning gate 22
support frame 25
filmstrip diverter 26
PTR support bracket 27
slide scanning gate 28
carriage 30
V-shaped notches 33 and 35
jaws 34 and 36
base 37
slide present sensor 38
stop pin 39
light integrating cavity 40
pivot links 41, 43 and 45
light integrator 42
light bar 44
pivoting assembly 46
scanning aperture 47
drive gear 48
aperture plate 49
rotary slide tray 50
circular base plate 51
webs 52
tray drive adaptor 53
inner ring wall 54
plunger 55
outer ring wall 56
attachment nut 57
pin 58
teeth 59
slide load arm 60
vertical guide plate 61
load arm drive motor 62
semi-rigid coupling 64
load arm home sensor 65
load arm away sensor 67
support frame plate 70
U-shaped aperture 71
load motor support bracket 72
slide aperture 73
slide guide 75
return motor support bracket 77
opening 78
electro-optical position sensor 80
slide return arm 81
dowel pin 82
return arm drive motor 83
semi-rigid coupling 84
return arm home sensor 85
return arm away sensor 87
tray drive motor 90
pulse counter 91
tray drive gear 92
tray present switch 93
slide control board 94
encoder wheel 95
gate controller board 96
CSE "mother" board 98
scanner housing 100
slide accessory door 102
shroud 103
slot 104
slot 106
U-shaped inner drive plate 108
door hinge assembly 110
cam surface 112
host computer 114

What is claimed is:

1. Apparatus for automatically feeding a slide from a slide tray slot into a film scanning plane of a slide scanning gate of a film scanner and returning the slide into the tray slot after the scanning process is completed comprising:

a film scanner frame having an aperture there aligned with said slide scanning gate for allowing the passage of a slide into and out of said slide scanning gate;

slide tray positioning means formed in said film scanner frame for accepting a slide tray and aligning a slide tray slot with said aperture;

slide tray moving means for moving a slide tray positioned by said slide tray positioning means to selectively align a tray slot with said aperture and said slide scanning gate of the film scanner;

a load arm mounted with respect to said film scanner frame at a first end thereof for movement of a second end thereof in a load arm path of travel between a home position and an engaging and moving position with respect to a slide in the aligned tray slot;

load arm drive motor means for moving said load arm in said load arm path of travel for engaging and moving a slide from said aligned tray slot through said aperture and into the scanning gate to enable the scanning thereof and for returning said load arm to said home position;

a return arm mounted with respect to said film scanner frame at a first end thereof for movement of a second end thereof in a return arm path of travel between a home position and an engaging and moving position with respect to a slide in the slide scanning gate; and return arm drive motor means for moving said return arm in said return arm path of travel for engaging and moving a slide from said slide scanning gate back through said aperture and into the aligned slot of said slide tray upon completion of the scanning thereof and for returning said return arm to said home position.

2. The apparatus of claim 1 further comprising:

first sensing means for sensing that a slide is seated in the slide scanning gate;

second sensing means for sensing the load arm and the return arm in the home positions thereof;

means for translating said slide scanning gate with respect to the film scanner to allow scanning of the slide; and slide scanning enabling means responsive to the first and second sensing means for enabling the translation of the slide scanning gate when the slide is sensed in the slide scanning gate by the first sensing means and the load arm and return arm are sensed in their home positions by the second sensing means.

3. The apparatus of claim 2 further comprising:

slide return enabling means for operating the return arm moving means to move the return arm in the return arm path of travel to return the scanned slide into the aligned tray slot upon completion of the scanning operation.

4. The apparatus of claim 3 further comprising:

slide tray enabling means for operating the slide tray moving means upon sensing that the return arm is in the home position by said second sensing means and that no slide is present in the slide scanning gate by the first sensing means, thereby moving the slide tray positioned by said slide tray positioning means to selectively align a further tray slot with said aperture and said slide scanning gate of the film scanner.

5. The apparatus of claim 4 further comprising:

third means for sensing the operation of the slide tray moving means and the movement of the slide tray to align a tray slot with said aperture; and load arm enabling means for operating the load arm moving means to move the load arm in the load arm path of travel upon sensing that the return arm is in the home position by said second sensing means, that no slide is present in the slide scanning gate by the first sensing means, and the movement of the slide tray to align a tray slot with said aperture, thereby moving the slide from the slide tray slot aligned with said aperture into said slide scanning gate of the film scanner.

6. The apparatus of claim 5 wherein the slide tray is a rotary slide tray and said slide tray positioning means further comprises adaptor means for allowing rotary cartridge to be inserted vertically and rotated about its central axis to present a slide tray slot in alignment with said aperture.

7. The apparatus of claim 1 wherein the slide tray is a rotary slide tray and said slide tray positioning means further comprises adaptor means for allowing a rotary cartridge to be inserted vertically and rotated about its central axis to present a slide tray slot in alignment with said aperture.

8. The apparatus of claim 1 wherein the return arm and the load arm are attached to their respective return arm drive motor and load arm drive motor through semi-rigid coupling.

9. The apparatus of claim 1 wherein said slide scanning gate further comprises:

means for centering a slide in registration with the film scanning plane of the film scanner regardless of variations in slide mount length, width and thickness.

10. Apparatus for automatically feeding a slide from a slide tray slot into a film scanning plane of a slide scanning gate of a film scanner and returning the slide into the tray slot after the scanning process is completed comprising:

a film scanner frame having an aperture therein aligned with said slide scanning gate for allowing the passage of a slide into and out of said slide scanning gate;

slide tray positioning means formed in said film scanner frame for accepting a slide tray and aligning a slide tray slot with said aperture;

slide tray moving means for moving a slide tray positioned by said slide tray positioning means to selectively align a tray slot with said aperture and said slide scanning gate of the film scanner;

means for moving a slide from said aligned tray slot into said slide scanning gate;

means for scanning the slide in the slide scanning gate; and means for returning the scanned slide from said slide scanning gate back into said aligned tray slot.

11. The apparatus of claim 10 wherein said slide scanning gate further comprises:

means for centering a slide in registration with the film scanning plane of the film scanner regardless of variations in slide mount length, width and thickness.

12. The apparatus of claim 11 wherein the slide tray is a rotary slide tray and said slide tray positioning means further comprises adaptor means for allowing the rotary cartridge to be inserted vertically and rotated about its central axis to present a slide tray slot in alignment with said aperture.

13. The apparatus of claim 10 wherein the slide tray is a rotary slide tray and said slide tray positioning means further comprises adaptor means for allowing the rotary slide tray to be inserted vertically and rotated about its central axis to present a slide tray slot in alignment with said aperture.

14. A scanning system for automatically scanning slides of different customer orders and types assembled in a single slide tray in a slide scanning gate comprising:

means for entering slide scanning data related to customer order and slide type for each slide included in a slide tray;

electronic control means for receiving the entered data and controlling operations of a slide scanner for automatically adjusting scanning parameters for scanning each slide in accordance with the film type and customer order instructions entered and for scanning slides in said slide scanning gate; and slide insertion/ejection means operable by said electronic control means for automatically inserting each identified slide from said slide tray into said slide scanning gate and ejecting scanned slides back into said slide tray upon completion of scanning.

15. The apparatus of claim 14 wherein: said scanning system further comprises:

a film scanner frame having an aperture therein aligned with said slide scanning gate for allowing the passage of a slide into and out of said slide scanning gate; and means for scanning the slide in the slide scanning gate; and said slide insertion/ejection means is responsive to commands from said electronic control means and further comprises:

slide tray positioning means formed in said film scanner frame for accepting a slide tray and aligning a slide tray slot with said aperture;

slide tray moving means for moving a slide tray positioned by said slide tray positioning means to selectively align a tray slot with said aperture and said slide scanning gate of the film scanner;

means for moving a slide from said aligned tray slot into said slide scanning gate; and means for returning the scanned slide from said slide scanning gate back into said aligned tray slot upon completion of slide scanning.

16. The apparatus of claim 15 wherein said slide scanning gate further comprises:

means for centering a slide in registration with the film scanning plane of the film scanner regardless of variations in slide mount length, width and thickness.

17. The apparatus of claim 15 wherein the slide tray is a rotary slide tray and said slide tray positioning means further comprises adaptor means for allowing the rotary slide tray to be inserted vertically and rotated about its central axis to present a slide tray slot in alignment with said aperture.

* * * * *